United States Patent [19]
Craft

[11] Patent Number: 5,883,086
[45] Date of Patent: Mar. 16, 1999

[54] DHEA-CONTAINING NUTRITIONAL SUPPLEMENT

[76] Inventor: John C. Craft, 162 Essex St. P.O. Box 1522, Montauk, N.Y. 11954

[21] Appl. No.: 850,850

[22] Filed: May 2, 1997

[51] Int. Cl.⁶ .................................................. A61K 31/595
[52] U.S. Cl. ........................... 514/168; 514/171; 514/570
[58] Field of Search ..................................... 514/168, 171, 514/570

[56] References Cited

U.S. PATENT DOCUMENTS

| | | |
|---|---|---|
| 4,837,239 | 6/1989 | Benjamin et al. . |
| 5,488,039 | 1/1996 | Masor et al. . |
| 5,569,670 | 10/1996 | Weischer et al. . |
| 5,571,441 | 11/1996 | Andon et al. . |

OTHER PUBLICATIONS

Sakai et al, Teratogenesis, Carcinogenesis & Mutagenesis, 14:219–237, 1994.
Steele et al, J. Cellular Biochem. Suppl. 20:32–54, 1994.

*Primary Examiner*—Rebecca Cook
*Attorney, Agent, or Firm*—Michael I. Kroll

[57] ABSTRACT

The present invention relates to a nutritional supplement (10) containing from 5% to 2000% each of the RDA of vitamins (18) A (22), C (26), D (28), E (30) and β-carotene (24), from 5% to 500% of the RDA of the minerals (20) selenium (32), zinc (34), magnesium (36), calcium (38), iodine (40) and potassium (42), from 5 to 100 mg dehydroepiandrosterone (DHEA) (12), from 0.1 to 10 mg trans-ferulic acid (14), and one or more plant extracts (16) selected from ginseng (46) and garlic (44). These DHEA-containing nutritional supplements are useful in the alleviation of an irregular heartbeat as well as the general symptoms of stress.

33 Claims, 5 Drawing Sheets

Fig. 1

Vitamins

18
- 22 A (Retinol)
- 24 β-Carotene
- 26 C (Ascorbic Acid)
- 28 D (a mixture of sterols, including Ergocalciferol ($D_2$) and Cholecalciferol ($D_3$))
- 30 E (Tocopherols and tocotrienols)

Minerals/Trace Elements

20
- 32 Selenium
- 34 Zinc
- 36 Magnesium
- 38 Calcium
- 40 Iodine
- 42 Potassium

Plant Extracts

16
- 44 Garlic
- 46 Ginseng

Fig. 2

Gender (Female) Specific Vitamins

48

52 $B_6$ (Pyridoxine, Pyridoxal, Pyridoxamine)

54 $B_{12}$ (Cyanocobalamin)

Gender (Female) Specific Mineral

50

56 Iron

Fig. 3

Gender (Male) Specific Compound

58 Aspirin (Acetylsalicylic Acid)

Fig. 4

62  4-Hydroxy-3-methoxycinnamic Acid 64  (Ferulic Acid)

70 Acetylsalicylic Acid 72 (Aspirin)

DHEA-CONTAINING NUTRITIONAL SUPPLEMENT

BACKGROUND OF THE INVENTION

1. Field of the Invention

The instant invention relates generally to vitamin and mineral-containing compositions for alleviating an irregular heartbeat and/or the symptoms of stress in humans and more specifically to compositions for alleviating an irregular heartbeat or stress which further contain dehydroxyepiandrosterone (DHEA).

2. Description of the Prior Art

Vitamin-containing compositions are well known in the art. For example, U.S. Pat. No. 5,571,441 (Andon, M. B. et al., 5 Nov. 1996) discloses a vitamin supplement containing 3 to 1000% of the RDA of vitamins, 10 to 4000 mg flavanols, and a bracer equivalent to 10 to 300 mg caffeine.

U.S. Pat. No. 4,837,239 (Benjamin, E. J., 6 Jun. 1989) discloses a cardiotonic composition containing a vitamin and a cardiotonic phospodiesterase inhibitor which is preferably a (2-oxo-1,2,3,5-tetrahydroimidazo[2,1-b] quinazoliniyl)-oxyalkylamide derivative.

U.S. Pat. No. 5,488,039 (Masor, M. L., 30 Jan. 1996) discloses a nutritional infant formula containing vitamins, minerals, protein, carbohydrates and four nucleotide equivalents which are monophosphate esters.

U.S. Pat. No. 5,569,670 (Weischer, C. H., 29 Oct. 1996) discloses a therapeutic composition containing vitamin E and R-α-lipoic acid.

BRIEF SUMMARY OF THE INVENTION

The present invention is concerned with a vitamin and mineral-containing composition for alleviating an irregular heartbeat and/or the symptoms of stress in humans and more specifically to compositions for alleviating an irregular heartbeat or stress which further contain DHEA.

A primary object of the present invention is to provide a nutritional supplement which contains vitamins, minerals and DHEA.

Another object of the present invention is to provide a nutritional supplement which contains vitamins, minerals, DHEA and trans-ferulic acid.

Another object of the present invention is to provide a nutritional supplement which contains vitamins, minerals, DHEA and one or more plant extracts including garlic and/or ginseng.

An additional object of the present invention is to provide a nutritional supplement for alleviating an irregular heartbeat in humans.

Another object of the present invention is to provide a nutritional supplement for alleviating the symptoms of stress in humans.

A further object of the present invention is to provide a nutritional supplement for lowering blood pressure in humans.

Another object of the present invention is to provide a nutritional supplement which may be used by the patient in an easy and convenient manner.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DETAILED DESCRIPTION OF THE PREFERRED EMBODIMENTS

Turning now descriptively to the drawings, in which similar reference characters denote similar elements throughout the several views, the Figures illustrate a vitamin supplement of the present invention. With regard to the reference numerals used, the following numbering is used throughout the various drawing figures.

a cardiac care composition, the preferred utility for the compositions of the present invention
dehydroepiandrosterone (DHEA), a first active component of the composition of the present invention
4-hydroxy-3-methoxycinnamic acid (trans-ferulic acid), a second active component of the composition of the present invention
plant extracts, a third active component of the composition of the present invention
a plurality of vitamins, a fourth active component of the composition of the present invention
one or more nutritional minerals, a fifth active component of the composition of the present invention
vitamin A, properly known as retinol
β-carotene, provitamin A, a precursor to vitamin A
vitamin C, properly known as ascorbic acid
vitamin D, actually a mixture of various sterols including ergocalciferol (vitamin $D_2$) and cholecalciferol (Vitamin $D_3$)
vitamin E, a mixture of various tocopherols, of which α-tocopherol and β-tocopherol are preferred, with α-tocopherol most preferred
selenium, an essential nonmetal mineral
zinc, an essential metal mineral -continued magnesium
calcium, an essential nonmetal mineral
iodine
potassium
garlic
ginseng
optional vitamins in the female gender-specific composition of the present invention
an optional mineral in the female gender-specific composition of the present invention
vitamin $B_6$, the generic name for pyridoxine, its amine (pyridoxamine) and its aldehyde (pyridoxal)
Vitamin $B_{12}$, also known as cyanocobalamin
iron, an essential metal mineral
acetylsalicylic acid (aspirin), an optional component in the male gender-specific composition of the present invention
the chemical structure for 4-hydroxy-3-methoxycinnamic acid (trans-ferulic acid)
4-hydroxy-3-methoxycinnamic acid, the IUPAC name for trans-ferulic acid
trans-ferulic acid, the informal name for 4-hydroxy-3-methoxycinnamic acid
$C_{10}H_{10}O_4$, the chemical composition of ferulic acid
the chemical structure for acetylsalicylic acid (aspirin)
acetylsalicylic acid, the IUPAC name for aspirin 20
aspirin, the generic name for acetylsalicylic acid 18
$C_9H_8O_4$, the chemical composition of aspirin FIGS. 1 through 6 illustrate a nutritional supplement of the present invention.

Figure 1:
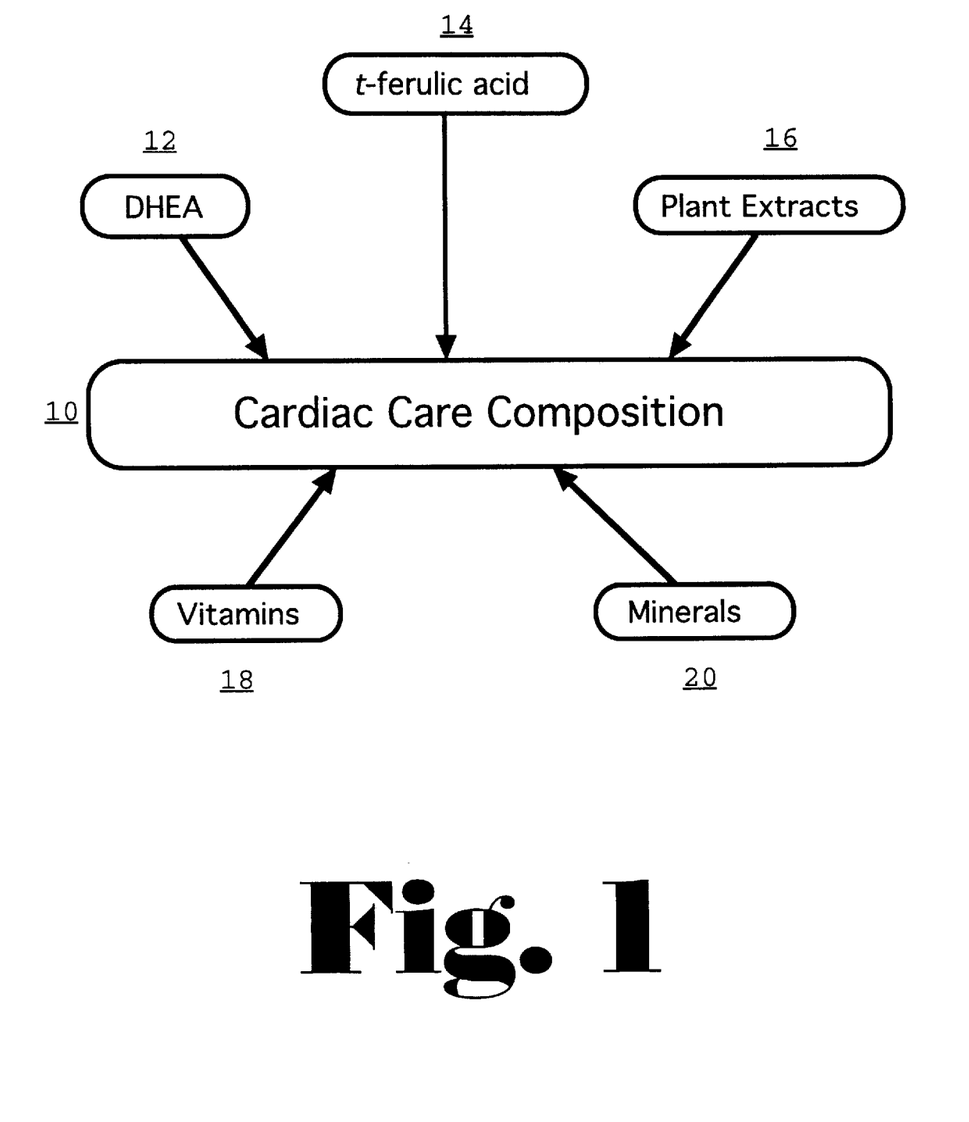
FIG. 1 is a diagrammatic view illustrating generally the various components which may find use in the present invention.

With reference to FIG. 1, the preferred utility for the compositions of the present invention is a cardiac care composition 10, as these compositions are usiful in alleviating an irregular heartbeat and in lowering blood pressure in humans. The composition of the present invention contains vitamins 18, minerals 20 and dehydroxyepiandrosterone (hereinafter DHEA) 12 as necessary components, with plant extracts 16 and 4-hydroxy-3-methoxycinnamic acid (hereinafter trans-ferulic acid) 14 as optional components.

DHEA, the most plentiful steroid hormone in the human body, is produced by the adrenal glands. The body converts DHEA into both testosterone and estrogen in men and women, although in different proportions by gender. DHEA has been implicated as an important factor in many conditions, including aging, cardiovascular disease, AIDS, obesity, Alzheimer's disease, breast cancer and memory function. Human serum DHEA concentrations have been shown to decline rapidly after the age of 30 in most people, suggesting that supplementation with DHEA may have beneficial effects for many people.

The compositions of the invention contain a functional amount of DHEA, preferably from about 5 to about 100 mg per dosage. It is preferred that the compositions are single daily dosages, although smaller dosages are appropriate if taken more than once per day. For single daily dosages, about 15 to about 60 mg of DHEA are preferred, most preferably from about 25 to about 50 mg. For most efficient physiological utilization, it is preferred that the DHEA be micronized.

Ferulic acid is one of the hydroxycinnamate intermediates in the phenylpropanoid synthetic pathway, and acts as an antioxidant by enhancing the resistance of low-density lipoprotein (LPL) to oxidation. Of the three primary hydroxycinnamates, caffeic acid, ferulic acid and p-coumaric acid, the order of decreasing antioxidant ability is caffeic acid>ferulic acid>p-coumaric acid. Recent studies report that ferulic acid is a more effective antioxidant against LDL oxidation than ascorbic acid (vitamin C). Ferulic acid has the structure 60 shown in FIG. 5, the chemical formula $C_{10}H_{10}O_4$ 66, a molecular weight of about 194, and the IUPAC name 4-hydroxy-3-methoxycinnamic acid 62.

The compositions of the invention contain an optional functional amount of trans-ferulic acid, preferably from about 0.1 to about 10 mg per dosage. It is preferred that the compositions are single daily dosages, although smaller dosages are appropriate if taken more than once per day. For single daily dosages, about 0.5 to about 5 mg of trans-ferulic acid are preferred, most preferably from about 1 to about 2 mg.

Figure 2:
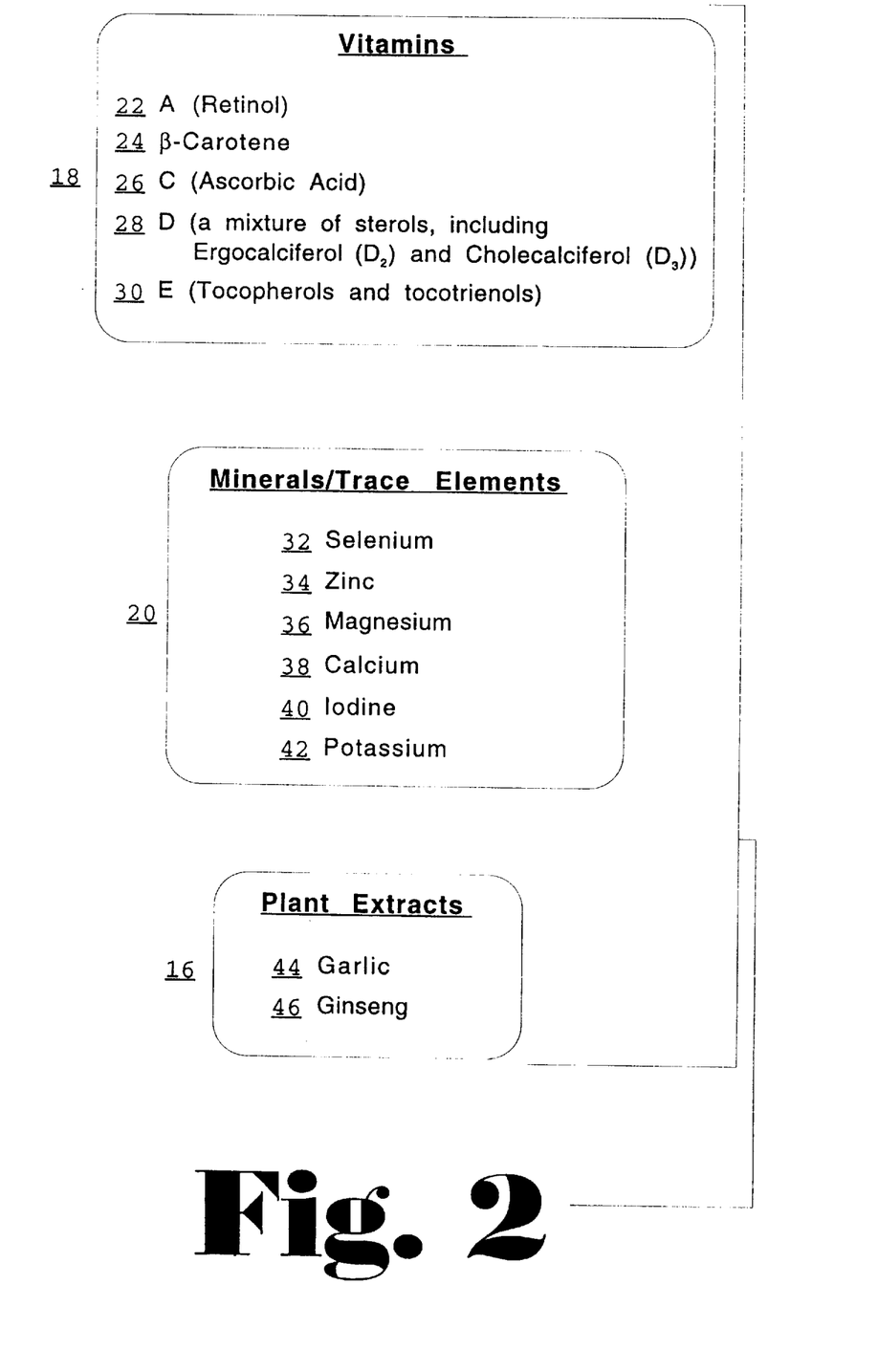
FIG. 2 is a chart illustrating specifically the various components which may find use in the present invention.

FIG. 2 illustrates, in specific terms, the preferred vitamins 18, minerals 20 and plant extracts 16 which may be used in the compositions of the present invention.

Of the plant extracts 16, garlic 44 and ginseng 46 extracts are preferred, with the most preferred compositions containing both garlic and ginseng. The extracts are preferably conentrated to contain the equivalent of up to about 500 mg each of fresh plant matter, more preferably from about 100 to about 500 mg each, most preferably from about 200 to about 400 mg each.

Of the vitamins 18, vitamins A 22, D 28, E 30, C 26 and β-carotene 24 are preferred. With regard to the concentration of the vitamins in the compositions of the present invention, this will also depend somewhat on the size, age, gender and health of the patient. Speaking generally, the vitamins will normally be from about 5% to about 2000% of the RDA for that vitamin, most often from about 25% to about 1000% of the RDA. Of course, the RDA can vary considerably with the factors illustrated above. Almost any accepted vitamin may be included in the present compositions, for example, vitamins A, D, E, K, C, thiamin, riboflavin, niacin, niacinamide, $B_6$, folate, $B_{12}$, biotin and pantothenic acid can all be included.

In general, the RDA for vitamin A will range from about 2000 International Units (IU) to about 5000 IU. Vitamin A precursors (provitamin A, carotenoids) can also be used including β-carotene, α-carotene, cryptoxanthine and the like. The vitamin A esters and β-carotene are highly preferred forms of vitamin A. The compositions of the invention can contain either or both of vitamin A and β-carotene. It is preferred that the total combined amount be from about 500 to about 50,000 IU, preferably from about 10,000 to about 40,000 IU. A particularly preferred composition contains about 1250 IU vitamin A and about 25,000 IU β-carotene.

The RDA for vitamin D will range from about 200 IU to about 400 IU. Vitamin D can be selected from, for example, cholecalciferol (D3), ergocalciferol (D2), and their biologically active metabolites and precursors such as, 1-α-hydroxy vitamin D, 25-hydroxy vitamin D, 1,25-dihydroxy vitamin D and the like. Vitamin D as a combination of the above-described compounds, as for example, from cod liver oil, is preferred. Also preferred is vitamin D as cholecalciferol. The compositions of the present invention will generally contain from about 50 to about 1000 IU vitamin D, more preferably from about 100 to about 400 IU.

The RDA for vitamin E will range from about 5 IU to about 15 IU. d-α-Tocopherol and its esters are highly preferred as a source for vitamin E. Other sources of vitamin E include β-tocopherol, γ-tocopherol, the tocotrienols and their esters, tocopheryl nicotinate, and the like. The compositions of the present invention will generally contain from about 10 to about 1000 IU vitamin E, more preferably from about 80 to about 400 IU.

The RDA of vitamin C will range from about 30 mg to about 95 mg. L-ascorbic acid is particularly preferred for the nutritional supplements of the present invention. However other forms of vitamin C, for example, D-ascorbic acid, DL-ascorbic acid, D-araboascorbic acid, dehydroascorbic acid and esters of ascorbic acid may also be used. The compositions of the present invention will generally contain from about 50 to about 1500 mg vitamin C, more preferably from about 500 to about 1500 mg.

Of the minerals 20, selenium 32, zinc 34, magnesium 36, calcium 38, iodine 40 and potassium 42 are preferred. With regard to the concentration of the minerals in the compositions of the present invention, this will also depend somewhat on the size, age, gender and health of the patient. Speaking generally, the minerals will normally be from about 5% to about 500% of the RDA for that mineral, most often from about 50% to about 500% of the RDA. Of course, the RDA can vary considerably with the factors illustrated above.

Almost any accepted mineral may be included in the present compositions, for example, calcium, phosphorus, magnesium, iron, zinc, iodine, selenium, copper, manganese, fluoride, chromium, molybdenum, potassium, and chloride can all be included. Additional minerals, though less preferred, include nickel, silicon, boron, tin, vanadium and cobalt. The minerals sources are preferably present in nutritionally relevant amounts, which means that the mineral sources used in the practice of this invention provide a nourishing amount of said minerals. Preferably, this amount comprises at least 5% of the RDA of these minerals, and more preferably, at least 10% of the RDA per unit dose of the finished supplement. Of course, it is recognized that the preferred daily intake of any mineral may vary with the user with greater than the RDA intakes being beneficial in some circumstances.

In general, the RDA for calcium will range from 400 mg for infants to 1200 mg for adults, depending somewhat on age and gender. The compositions of the present invention will generally contain from about 250 to about 5000 mg calcium, more preferably from about 1000 to about 4000 mg.

The RDA for magnesium ranges from 40 mg to 400 mg. The compositions of the present invention will generally contain from about 100 to about 1000 mg magnesium, more preferably from about 400 to about 1000 mg.

The RDA for zinc ranges from 5 mg to 19 mg. The RDA for iodine ranges for 40 ug to 200 ug. The compositions of the present invention will generally contain from about 5 to about 100 mg zinc, more preferably from about 10 to about 75 mg.

The RDA for selenium ranges from 10 ug to 75 mg. The compositions of the present invention will generally contain from about 10 to about 100 $\mu$g selenium, more preferably from about 25 to about 75 $\mu$g.

The compositions of the present invention will generally contain from about 25 to about 250 $\mu$g iodine, more preferably from about 75 to about 200 $\mu$g.

There are no specific RDA levels for potassium, but the estimated minimum requirement of potassium is from 500 to 2000 mg/day for adults. The compositions of the present invention will generally contain from about 50 to about 1000 mg potassium, more preferably from about 200 to about 800 mg.

The source of the mineral salt, both those with established RDA levels or with safe and adequate intake levels, as well as those with no as yet established human requirement, used in the practice of this invention can be any of the well known salts including carbonate, oxide, hydroxide, chloride, sulfate, phosphate, gluconate, lactate, acetate, fumarate, citrate, malate, amino acids and the like for the cationic minerals and potassium, calcium, magnesium and the like for the anionic minerals. However, the particular salt used and the level will depend upon their interaction with other supplement ingredients.

Figure 3:
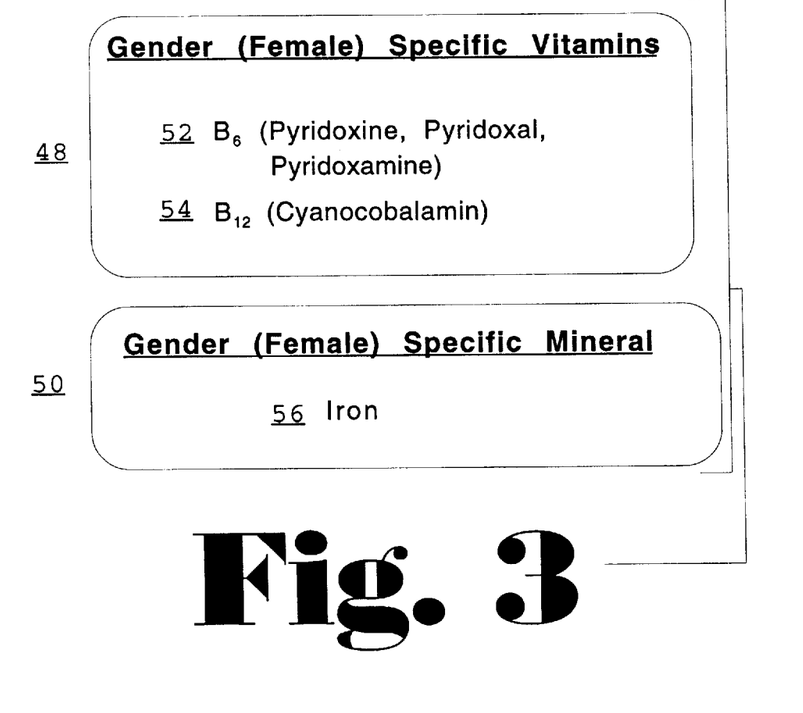
FIG. 3 is a chart illustrating components which can be effectively included in a female gender-specific composition of the present invention.

FIG. 3 illustrates a female gender-specific formula of the present invention. In addition to the constituents described in detail above, these compositions contain additional vitamins 48 and minerals 50. The vitamins are vitamins $B_6$ 52 and $B_{12}$ 54, and the minerals are iron 56 and additional calcium 38.

Vitamin $B_6$ can be selected from hydrochloride salts or 5'-phosphates of pyridoxine, pyridoxamine or pyridoxal. The preferred vitamin $B_6$ is pyridoxine hydrochloride. When present, the compositions of the present invention will generally contain from about 0.5 to about 20 mg vitamin $B_6$, more preferably from about 1 to about 5 mg.

Sources of vitamin $B_{12}$ are, for example, cyanocobalamin, methylcobalamin, adenosylcobalamin, hydroxocobalamin and the like. Cyanocobalamin is highly preferred. When present, the compositions of the present invention will generally contain from about 1 to about 75 mg vitamin $B_{12}$, more preferably from about 2 to about 20 mg.

The RDA for iron ranges from 6 mg to 30 mg, depending somewhat on age and physiologic state. When present, the compositions of the present invention will generally contain from about 1 to about 100 mg iron, more preferably from about 5 to about 50 mg.

Figure 4:
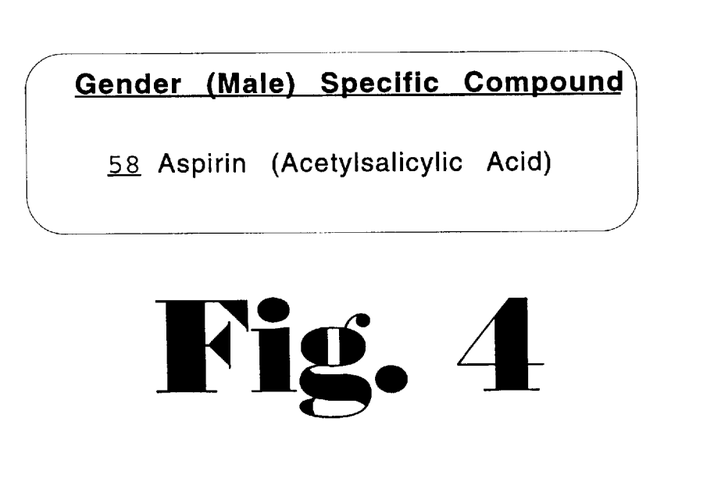
FIG. 4 is a chart illustrating a component which can be effectively included in a male gender-specific composition of the present invention.
Figure 5:
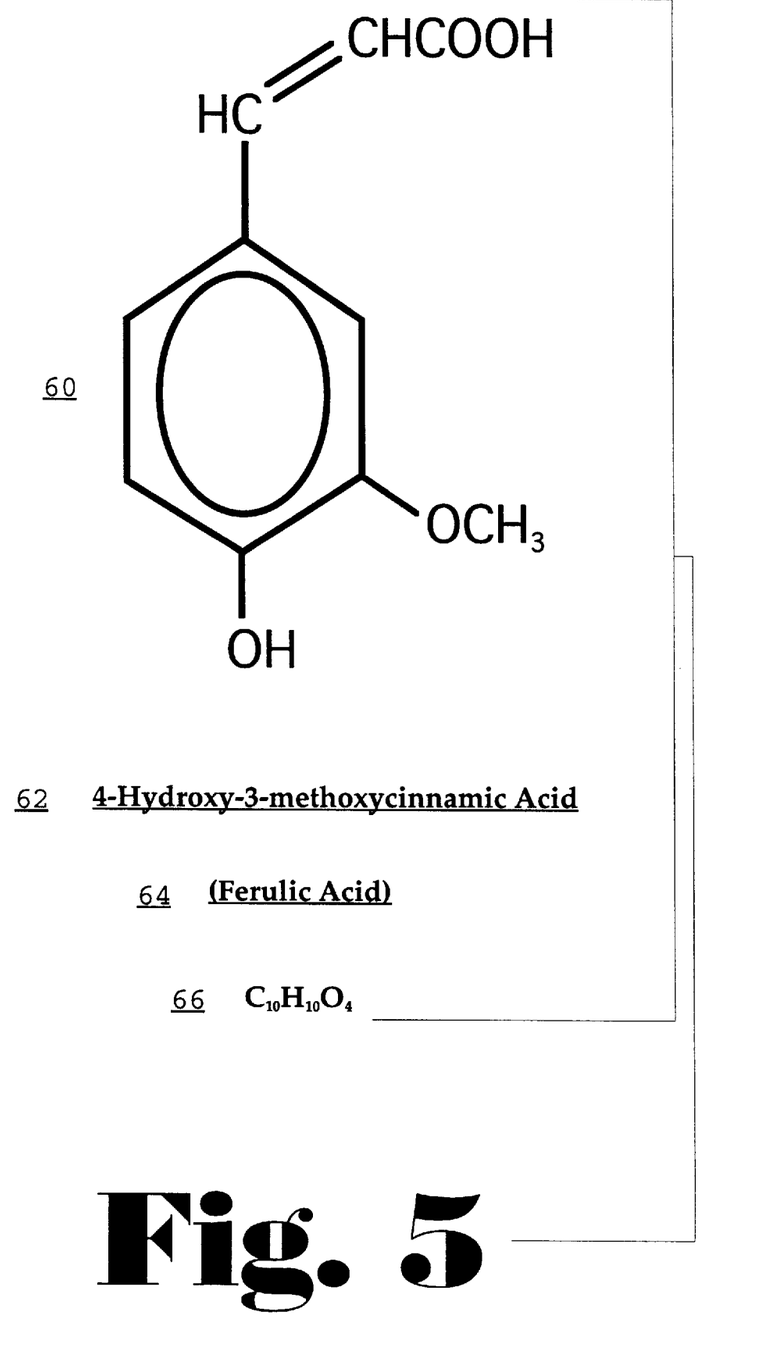
FIG. 5 is the chemical structure for 4-hydroxy-3-methoxycinnamic acid, also known as trans-ferulic acid, an active ingredient in the composition of the present invention.

FIG. 4 illustrates a male gender-specific formula of the present invention. In addition to the constituents described in detail above, these compositions contain aspirin 58 as an inhibitor or of platelet aggregation and vascular occlusion. This is a primary concern in cardiac and cerebrovascular care patients, both for treatment of, and prophylaxis of, thrombosis and vascular spasm. Cardiac care patients include, for example, potential and prior heart attack patients and potential and prior stroke patients. The most widely accepted substance for this purpose is aspirin (acetylsalicylic acid). In the arachidonic acid cascade, aspirin acts as a cyclooxygenase inhibitor, blocking the conversion of arachidonic acid to the $PGH_2$ precursor prostaglandin $G_2$ ($PGG_2$). Since $PGG_2$ is a precursor to both $TxA_2$ and $PGI_2$, aspirin blocks both the aggregation inducing and aggregation inhibiting effects of these factors, respectively.

With regard to the amount of aspirin in the compositions of the invention, a therapeutically effective and nontoxic amount can be readily determined by the ordinary skilled physician, with the precise amount depending on various factors, including, for example, size and health of the patient. Generally accepted values include from 0.5 mg of aspirin per Kg of body weight of the patient per day to 5 or more mg/Kg/day. For most people, a range of from about 10 to about 1000 mg/day, and preferably from about 25 to about 500 mg/day, will often be appropriate, particularly in the range of from about 75 to about 250 mg/day. It is anticipated that the above-described aspirin concentrations will be most appropriate for use in compositions for treating cardio/cerebrovascular care patients. Aspirin is also well recognized to reduce fever, pain and inflammation. For use in fever reduction, pain control and inflammation reduction, concentrations will be somewhat higher.

Figure 6:
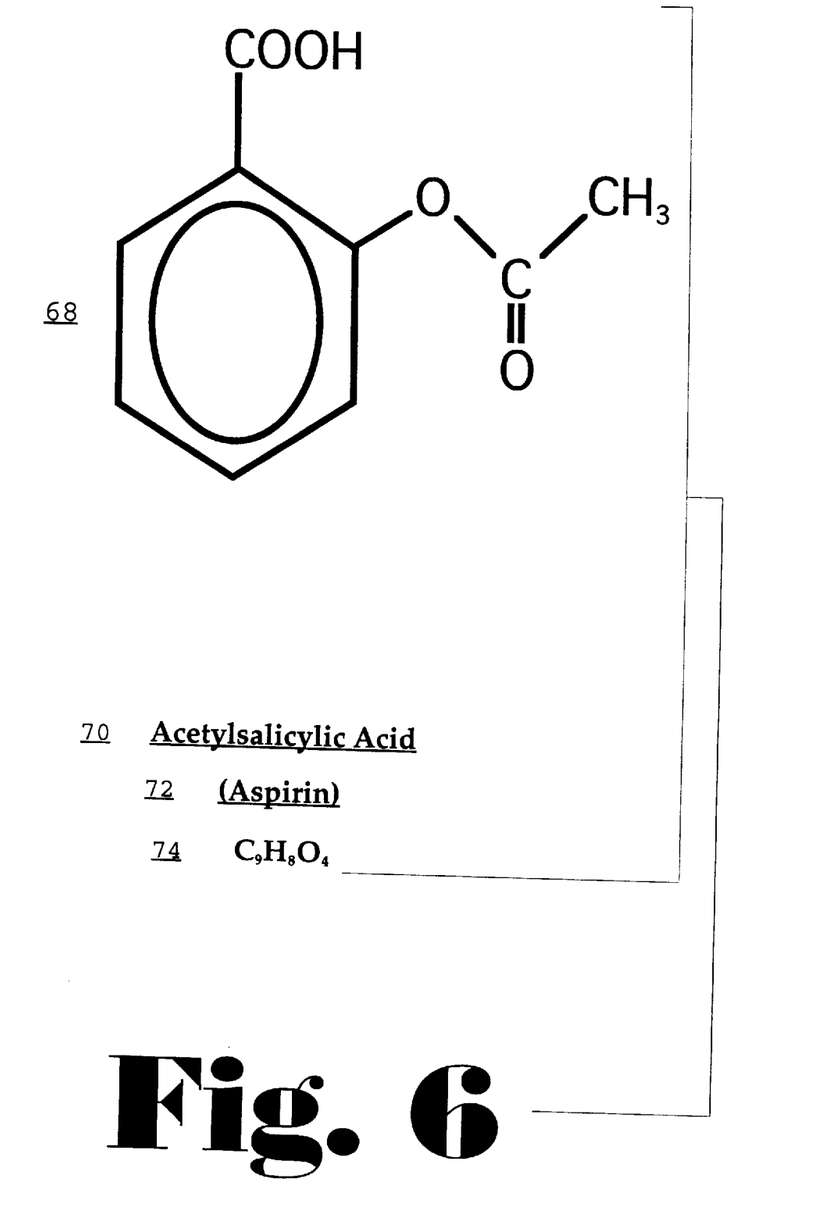
FIG. 6 is the chemical structure for acetylsalicylic acid, also known as aspirin, an active ingredient in the male gender-specific composition of the present invention.

Aspirin has the structure 68 shown in FIG. 6, the chemical formula $C_9H_8O_4$ 74, a molecular weight of about 180, and the IUPAC name acetylsalicylic acid 70.

It will be understood that each of the elements described above, or two or more together, may also find a useful application in other types of applications differing from the type described above. While the invention has been illustrated and described as embodied in nutritional supplement, it is not intended to be limited to the details shown, since it will be understood that various omissions, modifications, substitutions and changes in the forms and details of the formulation illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed as new and desired to be protected by Letters Patent is set forth in the appended claims.

I claim:

1. A nutritional supplement consisting essentially of:
    a) from about 5% to about 2000% of the RDA of one or more vitamins;
    b) from about 5% to about 500% of the RDA of one or more minerals;
    c) from about 5 to about 100 mg dehydroepiandrosterone; and
    d) from about 0.1 to about 10 mg trans-ferulic acid.

2. A nutritional supplement consisting essentially of
    a) from about 5% to about 2000% of the RDA of one or more vitamins;
    b) from about 5% to about 500% of the RDA of one or more minerals;
    c) from about 5 to about 100 mg dehydroepiandrosterone;
    d) from about 0.1 to ab=out 10 mg trans-ferulic acid; and
    e) one or more plant extracts.

3. The nutritional supplement as defined in claim 2 wherein said plant extracts are selected from ginseng and garlic or a mixture thereof.

4. The nutritional supplement as defined in claim 3, having from about 100 to about 500 mg each of ginseng and garlic.

5. The nutritional supplement as defined in claim 4 having from about 200 to about 400 mg each of ginseng and garlic.

6. The nutritional supplement as defined in claim 1, wherein said vitamins are selected from vitamins A, C, D, E, and β-carotene or a mixture thereof.

7. The nutritional supplement as defined in claim 1, wherein said vitamins are;
    a) from about 500 to about 50,000 IU vitamin A;
    b) from about 50 to about 1500 mg vitamin C;
    c) from about 50 to about 100 IU vitamin D;
    d) from about 80 to about 800 IU vitamin E; and
    e) from about 500 to about 50,000 IU β-carotene.

8. The nutritional supplement as defined in claim 1, wherein said vitamins are;
    a) about 1250 IU vitamin A;
    b) about 1000 mg vitamin C;
    c) about 135 IU vitamin D;
    d) about 400 IU vitamin E; and
    e) about 25,000 IU β-carotene.

9. The nutritional supplement as defined in claim 7, wherein said minerals are selected from selenium, zinc, magnesium, calcium, iodine and potassium or a mixture thereof.

10. The nutritional supplement as defined in claim 9, having from about 50% to about 500% of the RDA of said minerals.

11. The nutritional supplement as defined in claim 10, having selenium, zinc, magnesium, calcium, iodine and potassium.

12. The nutritional supplement as defined in claim 11, having;
    a) from about 10 to about 100 μg selenium;
    b) from about 5 to about 100 mg zinc;
    c) from about 100 to about 1000 mg magnesium;
    d) from about 250 to about 5000 mg calcium;
    e) from about 25 to about 250 μg iodine; and
    f) from about 50 to about 1000 mg potassium.

13. The nutritional supplement as defined in claim 12, having;
    a) about 50 μg selenium;
    b) about 45 mg zinc;
    c) about 800 mg magnesium;
    d) about 2000 mg calcium;
    e) about 150 μg iodine; and
    f) about 550 mg potassium.

14. The nutritional supplement as defined in claim 6, having from about 15 to about 60 mg dehydroepiandrosterone.

15. The nutritional supplement as defined in claim 14, having about 25 mg dehydroepiandrosterone.

16. The nutritional supplement as defined in claim 14, wherein said dehydroepiandrosterone is micronized.

17. The nutritional supplement as defined in claim 9, having from about 15 to about 60 mg dehydroepiandrosterone.

18. The nutritional supplement as defined in claim 17, having about 25 mg dehydroepiandrosterone.

19. The nutritional supplement as defined in claim 17, wherein said dehydroepiandrosterone is micronized.

20. The nutritional supplement as defined in claim 14 having from about 0.5 to about 5 mg trans-ferulic acid.

21. The nutritional supplement as defined in claim 20 having about 1 mg trans-ferulic acid.

22. The nutritional supplement as defined in claim 17 having from about 0.5 to about 5 mg trans-ferulic acid.

23. The nutritional supplement as defined in claim 22, having about 1 mg trans-ferulic acid.

24. The nutritional supplement as defined in claim 1, in tablet, capsule, powder, suspension or suppository form.

25. The nutritional supplement consisting essentially of:
    a) from about 5% to about 2000% of the RDA of vitamins A, C, D, E and β-carotene;
    b) from about 5% to about 500% of the RDA of selenium, zinc, magnesium, calcium, iodine and potassium;
    c) from about 5 to about 100 mg dehydroepiandrosterone;
    d) from about 0.1 to about 10 mg trans-ferulic acid; and
    e) ginseng and garlic extracts.

26. The nutritional supplement as defined in claim 25, having;
    a) from about 500 to about 50,000 IU vitamin A;
    b) from about 50 to about 1500 mg vitamin C;
    c) from about 50 to about 1000 IU vitamin D;
    d) from about 80 to about 800 IU vitamin E;
    e) from about 500 to about 50,000 IU β-carotene;
    f) from about 10 to about 100 μg selenium;
    g) from about 5 to about 100 mg zinc;
    h) from about 100 to about 1000 mg magnesium;
    i) from about 250 to about 5000 mg calcium;

j) from about 25 to about 250 µg iodine;

k) from about 50 to about 1000 mg potassium;

l) from about 15 to about 60 mg dehydroepiandrosterone;

m) from about 0.5 to about 5 mg trans-ferulic acid; and n) from about 100 to about 500 mg each of garlic and ginger extracts.

27. The nutritional supplement as defined in claim 26, having;

a) about 1250 IU vitamin A;

b) about 1000 mg vitamin C;

c) about 135 IU vitamin D;

d) about 400 IU vitamin E;

e) about 25,000 IU β-carotene;

f) about 50 µg selenium;

g) about 45 mg zinc;

h) about 800 mg magnesium;

i) about 2000 mg calcium;

j) about 150 µg iodine;

k) about 550 mg potassium l) about 25 mg micronized dehydroepiandrosterone; and m) about 1 mg trans-ferulic acid.

28. The nutritional supplement consisting essentially of a) from about 5% to about 2000% of the RDA of vitamins A, C, D, E and β-carotene;

b) from about 5% to about 500% of the RDA of selenium, zinc, magnesium, calcium, iodine and potassium;

c) from about 5 to about 100 mg dehydroepiandrosterone;

d) from about 0.1 to about 10 mg trans-ferulic acid;

e) ginseng and garlic extracts; and f) a therapeutically effective amount of acetylsalicylic acid.

29. The nutritional supplement as defined in claim 28, having from about 25 to about 250 mg acetylsalicylic acid.

30. The nutritional supplement as defined in claim 29, having about 81 mg acetylsalicylic acid.

31. A nutritional supplement consisting essentially of a) from about 5% to about 2000% of the RDA of vitamins A, C D E and β-carotene;

b) from about 5% to about 500% of the RDA of selenium zinc, magnesium, calcium, iodine, and potassium;

c) from about 5 to about 100 mg dehydroepiandrosterone;

d) from about 0.1 to about 10 mg trans-ferulic acid;

e) ginseng and garlic extracts; and f) from about 5 to about 100 mg iron;

g) from about 0.5 to about 25 mg vitamin $B_6$; and h) from about 2 to about 50 mg vitamin $B_{12}$.

32. The nutritional supplement as defined in claim 31, having a) about 20 mg iron;

b) about 2 mg vitamin $B_6$; and c) about 6 mg vitamin $B_{12}$.

33. The nutritional supplement as defined in claim 26, in tablet, capsule, powder, suspension or suppository form.

* * * * *